Figure 1:
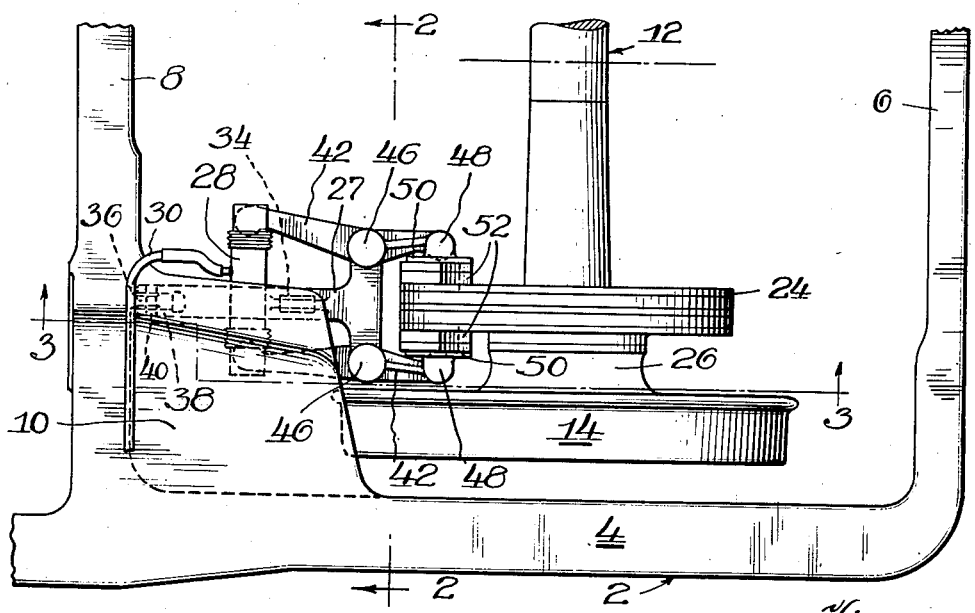

March 7, 1944.　　　C. E. TACK　　　2,343,342
RAILWAY BRAKE
Filed May 1, 1942

INVENTOR.
Carl E. Tack
BY
Atty

Patented Mar. 7, 1944

2,343,342

UNITED STATES PATENT OFFICE 2,343,342

RAILWAY BRAKE

Carl E. Tack, Chicago, Ill., assignor to American Steel Foundries, Chicago, Ill., a corporation of New Jersey Application May 1, 1942, Serial No. 441,257

10 Claims. (Cl. 188—59)

This invention relates to brake rigging and more particularly to rigging for an off-wheel brake arrangement for a railway car truck in which a brake disc is supported from each end of a wheel and axle assembly and is braked by friction shoes supported at opposite sides thereof.

The subject matter of this invention is a continuation in part of my co-pending application Serial No. 407,719 resulting in United States Letters Patent No. 2,295,244, issued September 8, 1942. The parent case is directed to the manner in which actuating fluid is transmitted to the cylinder associated with the off-wheel brake rigging, whereby the rigging is actuated in conjunction with a brake arrangement of conventional type in which a brake shoe engages the periphery of each wheel, whereas the instant case is directed solely to the manner in which the off-wheel brake rigging is suspended and in no way relates to the means for transmitting actuating fluid to the power cylinder.

An object of my invention is to devise an off-wheel brake arrangement in which the brake shoes are suspended from the truck frame in such manner as to snub during actuation of said shoes vertical movements of the truck frame which is spring supported from the wheel and axle assemblies.

A more specific object of my invention is to provide a separate brake frame for the rigging associated with each disc, said frame affording a support for the brake levers associated with the brake shoes and said brake frame being supported solely from the truck frame. It will be apparent to those skilled in the art that by thus supporting the brake frame, relative vertical movement between the wheel and axle assembly and the truck frame will be snubbed by means of the brake rigging during actuation thereof.

A still more specific object of my invention is an arrangement whereby the brake frame is afforded a two-point support from the truck frame, said two-point support comprising a lug on the top of the brake frame secured within a bracket on the truck frame, and also a bracket on the rear end of the brake frame receiving a lug on the transom of the truck frame.

My invention comprehends a brake frame of novel form, said brake frame being T-shaped in plan view and comprising an integral support lug on the top thereof and an integral support bracket on the end thereof remote from the associated brake disc, said lug and said bracket co-operating with means on the truck frame to afford a two-point support for said brake frame as heretofore described. My novel brake frame may be provided with an integrally cast hydraulic cylinder affording power means for the brake levers pivotally fulcrumed from the frame.

In the drawing, Figure 1 is a fragmentary top plan view of a railway car truck embodying my invention, only one corner of the truck being shown inasmuch as the brake rigging associated with each disc is substantially identical with that associated with the other discs.

Figure 2:
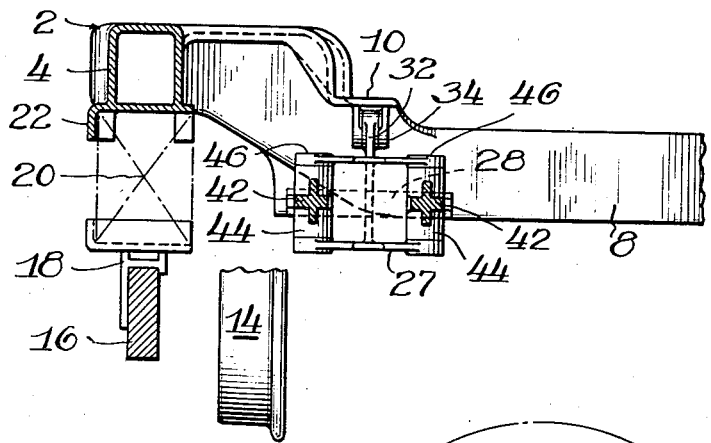
Figure 3:
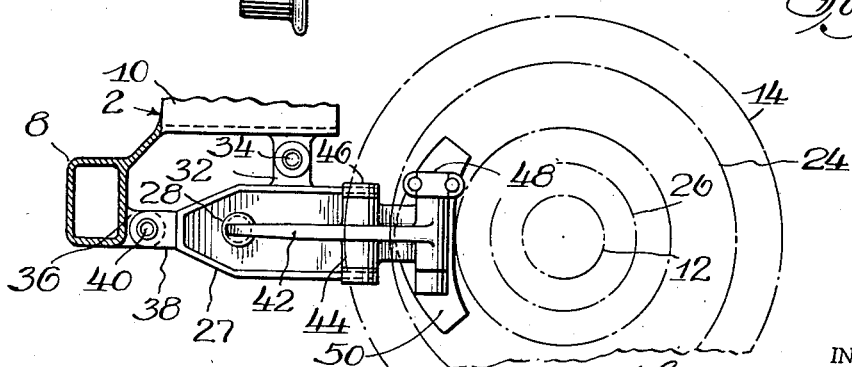

Figure 2 is a sectional view of the structure shown in Figure 1, the section being taken in the plane indicated by the line 2—2 of Figure 1, and Figure 3 is a fragmentary sectional view taken in the planes indicated by the line 3—3 of Figure 1.

In each of said views certain details may be omitted where they are more clearly seen in other views.

Describing my invention in detail, the truck frame generally designated 2 comprises at each side thereof a side rail 4 and at each end thereof an end rail 6 as well as a transom 8 at each side of the transverse center line of the truck. A gusset 10 is formed at the juncture of each transom 8 with each side rail 4, said gusset affording a support for the associated brake frame as hereinafter more fully described. The truck is supported at each end thereof by a wheel and axle assembly 12 comprising a wheel 14 at each end thereof. Journal boxes (not shown) are mounted on the ends of the assembly 12 and an equalizer 16 of usual form is mounted in the usual manner on the journal boxes at each side of the truck. A spring seat 18 is positioned on the equalizer adjacent each end thereof and supports a spring group diagrammatically indicated at 20 (Figure 2), said group being positioned at the upper end thereof by a spring seat 22 on the side frame 4. It will be readily apparent to those skilled in the art that relative movement of the side frame 2 and the wheel and axle assembly 12 will cause the spring group 20 to oscillate and it will also be apparent that uncontrolled oscillation of the spring group 20 may result in excessive movement between the side frame and the wheel and axle assembly. It is believed that such excessive movement may cause skidding of the wheels 14, 14 upon the associated rails during actuation of the brake mechanism by unloading the wheel and axle assemblies of the weight of the frame. It is accordingly an object of this invention, as hereinafter more fully described, to suspend the brake rigging from the truck frame in such manner as to enable snubbing thereby of vertical movement of the truck frame during actuation of the brake mechanism.

A brake disc 24 is secured to each wheel 14 in any convenient manner by means of a hub portion 26 (Figure 1) on the wheel, said disc being formed and arranged for braking engagement at opposite sides thereof with friction shoes supported from the truck frame as hereinafter more fully described. Adjacent each disc 24 is suspended a brake frame 27, said frame comprising a vertical body portion flanged therearound, as best seen in Figure 3 and said frame being T-shaped in plan as best seen in Figure 1. A hydraulic cylinder 28 may be cast integral with the brake frame 27 or may be mounted thereon in any convenient manner, actuating fluid being supplied to said cylinder through the supply pipe 30, as more fully described in my said copending application.

A lug 32 is formed on the top of the brake frame 27 and is pivotally connected at 34 to a bracket on the gusset 19, and a lug 36 on the transom is received within the bracket 38 on the rear end of the brake frame 27 and is pivotally connected as at 40. A brake lever 42 is positioned at each side of the brake frame 27 and comprises a trunnion portion 44 pivotally fulcrumed at 46 on the brake frame 27, the inner end of each lever being engaged with a piston in the hydraulic power cylinder and the outer end of the lever being pivotally connected at 48 to a brake head 50, carrying a brake shoe 52 formed and arranged for frictional engagement with the adjacent side of the brake disc 24.

Thus it will be seen that I have afforded a novel brake rigging for an off-wheel brake arrangement in which a brake disc mounted on a wheel and axle assembly is braked by means of friction shoes mounted on the ends of brake levers, said brake levers being fulcrumed from a brake frame which is afforded a two-point support from the truck frame, said two-point support being the only means of suspension for the brake frame and being effective to permit snubbing of vertical movements of the truck frame by the brake rigging during actuation thereof. It will be understood that during actuation of the brake mechanism, relative lateral movement between the truck frame and the wheel and axle assembly will be afforded by the engagement of the brake levers with the movable pistons in the hydraulic power cylinder and, if desired, said lateral movement may be further accommodated by means of resilient bushings at the connections 34 and 40 between the brake frame and the truck frame. When the brake shoes 52, 52 are in released position, they are spaced a sufficient distance from the brake disc 24 to permit lateral movement of the wheel and axle assembly without engaging the disc with the shoes.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a vehicle frame, a supporting wheel and axle assembly, a brake disc supported therefrom, a brake frame spaced from said assembly, power means on said brake frame, brake levers pivotally fulcrumed therefrom and engaged with said means, friction means supported from said levers for engagement with opposite sides of said disc, and a support for said brake frame, said support being characterized by a connection between the top of said brake frame and said vehicle frame and another connection between said vehicle frame and the end of said brake frame remote from said disc.

2. In a brake arrangement, a vehicle frame, a supporting wheel and axle assembly comprising an axle and a member rotatable therewith, a brake frame casting hung from said frame, said casting being so hung from the top thereof and the end thereof remote from said member, a cylinder integrally formed with said casting, brake levers fulcrumed from said casting at opposite sides of said member, friction means on said levers for engagement with said member, and pistons in said cylinder in abutment with respective levers.

3. In a brake arrangement, a vehicle frame, a supporting wheel and axle assembly, a brake disc supported therefrom, a brake frame, power means thereon, brake levers pivotally fulcrumed from said brake frame and engaged with said means, friction means supported from said levers for engagement with opposite sides of said disc, and a support for said brake frame from said vehicle frame, said support comprising a lug on the top of said brake frame and a bracket on the end thereof remote from said disc, a bracket and a lug on said vehicle frame, and means securing said lugs within said brackets.

4. In a brake arrangement, a vehicle frame, a supporting wheel and axle assembly comprising an axle and a member rotatable therewith, a brake frame spaced from said assembly, brake levers pivotally fulcrumed from said brake frame, actuating means associated with said levers, friction means supported from said levers for engagement with opposite sides of said member, and a support for said brake frame characterized by a connection between the top thereof and said vehicle frame and another connection between said vehicle frame and the end of said brake frame remote from said member.

5. In a brake arrangement, a vehicle frame, a supporting wheel and axle assembly comprising an axle and a concentric member rotatable therewith, a brake frame spaced from said assembly, friction means supported from said brake frame for engagement with said member, actuating means for said friction means, and a support for said brake frame characterized by a connection between the top thereof and said vehicle frame and another connection between said vehicle frame and the end of said brake frame remote from said member.

6. In a brake frame casting for a railway car truck, a member having spaced jaws at one end thereof affording fulcrums for associated brake levers, and means on the opposite end thereof for securement to an associated vehicle frame, said member having additional means on the top thereof for securement to said vehicle frame.

7. In a brake frame casting for a railway car truck, a member having spaced jaws at one end thereof affording fulcrums for associated brake levers, means on the opposite end thereof for securement to an associated vehicle frame, said member having additional means on the top thereof for securement to said vehicle frame, and an integral cylinder formed on said member intermediate the ends thereof.

8. In a brake frame casting, a T-shaped member having a body portion and a portion on one end thereof extending transversely with respect thereto, said transversely extending portion comprising spaced fulcrum means for associated brake levers, and securing means formed on the top of said body portion and on the end thereof remote from the transversely extending portion.

9. In a brake frame casting, a T-shaped member having a body portion and a portion on one end thereof extending transversely with respect thereto, said transversely extending portion comprising spaced fulcrum means for associated brake levers, securing means formed on the top of said body portion and on the end thereof remote from the transversely extending portion, and a cylinder formed on said body portion intermediate the ends thereof and extending substantially parallel with said transversely extending portion.

10. In a brake arrangement, a wheel and axle assembly and a vehicle frame supported therefrom, a member rotatable with said assembly, a brake frame, brake levers fulcrumed from said brake frame at opposite sides of said member, friction means carried by said levers for engagement with said member, actuating means associated with said levers, and a support for said brake frame characterized by a plurality of connections between the brake frame and the vehicle frame, certain of said connections being disposed in a horizontal plane passing through said axle and other of said connections being disposed in a horizontal plane extending thereabove.

CARL E. TACK.